(12) United States Patent
Vincan et al.

(10) Patent No.: US 12,145,295 B2
(45) Date of Patent: Nov. 19, 2024

(54) METHOD FOR APPLYING A PROTECTIVE COATING TO A HAUL TRUCK TRAY

(71) Applicant: MIS.CARBONART PTY LTD, Applecross (AU)

(72) Inventors: Alexander Vincan, Mosman Park (AU); Yue Sun, Thornlie (AU); Gary Charles Strickland, Kalamunda (AU)

(73) Assignee: MIS.CARBONART PTY LTD, Applecross (AU)

( * ) Notice: Subject to any disclaimer, the term of this patent is extended or adjusted under 35 U.S.C. 154(b) by 482 days.

(21) Appl. No.: 17/641,106

(22) PCT Filed: Jul. 24, 2020

(86) PCT No.: PCT/AU2020/050760
§ 371 (c)(1),
(2) Date: Mar. 8, 2022

(87) PCT Pub. No.: WO2021/012015
PCT Pub. Date: Jan. 28, 2021

(65) Prior Publication Data
US 2022/0332020 A1 Oct. 20, 2022

(30) Foreign Application Priority Data
Jul. 24, 2019 (AU) ................ 2019902628

(51) Int. Cl.
*B29C 37/00* (2006.01)
*B05D 1/00* (2006.01)
(Continued)

(52) U.S. Cl.
CPC .......... *B29C 37/0028* (2013.01); *B05D 1/005* (2013.01); *B05D 7/14* (2013.01);
(Continued)

(58) Field of Classification Search
CPC ....... B29C 37/0028; B29C 33/58; B60P 1/286
See application file for complete search history.

(56) References Cited

U.S. PATENT DOCUMENTS 4,752,098 A * 6/1988 Shock ..................... B60R 13/01
296/184.1
5,858,508 A * 1/1999 Sturtevant ................ B05D 1/02
264/80

(Continued)

FOREIGN PATENT DOCUMENTS

EP 1488988 A1 * 12/2004 ................ B60P 1/04

*Primary Examiner* — Nathan H Empie
(74) *Attorney, Agent, or Firm* — Haynes and Boone, LLP

(57) ABSTRACT

Embodiments herein provide a method of applying a protective coating to a haul truck tray. The method includes (i) installing a mould on at least a portion of the haul truck tray, (ii) placing the at least a portion of the haul truck tray into a jig framework, (iii) heating at least a portion of the haul truck tray placed on the jig framework, (iv) providing a source of fluid protective coating at an elevated point on the at least a portion of the haul truck tray placed on the jig framework, (v) coating at least a portion of the haul truck tray surface with a substantially uniform layer of fluid protective coating, and (vi) allowing the substantially uniform layer of fluid protective coating to cure.

19 Claims, 13 Drawing Sheets

(51) Int. Cl.
*B05D 7/14* (2006.01)
*B29C 33/58* (2006.01)
B29K 307/04 (2006.01)
B29L 31/30 (2006.01)
B60R 13/01 (2006.01)

(52) U.S. Cl.
CPC .......... *B29C 33/58* (2013.01); *B29K 2307/04* (2013.01); *B29L 2031/30* (2013.01); *B60R 13/01* (2013.01)

(56) References Cited

U.S. PATENT DOCUMENTS

| | | | | |
|---|---|---|---|---|
| 2008/0211252 A1* | 9/2008 | Emch | ...................... | B60R 13/01 |
| | | | | 296/39.2 |
| 2010/0221437 A1* | 9/2010 | Sizer | ................... | B29C 37/0028 |
| | | | | 524/507 |
| 2014/0312642 A1* | 10/2014 | Amstutz | ................. | B60P 1/286 |
| | | | | 427/379 |

* cited by examiner

METHOD FOR APPLYING A PROTECTIVE COATING TO A HAUL TRUCK TRAY

PRIORITY CLAIM AND CROSS REFERENCE TO RELATED APPLICATIONS

This application is a National Phase of PCT/AU2020/050760 filed Jul. 24, 2020, which claims benefit of and priority to Australia Provisional Patent Application AUSN 2019902628 filed Jul. 24, 2019, titled METHOD FOR APPLYING A PROTECTIVE COATING TO A HAUL TRUCK TRAY, and is hereby incorporated by reference in its entirety, to the extent it is not inconsistent herewith.

This application incorporates by reference in its entirety, to the extent it is not inconsistent herewith, Australia Provisional Patent Application AUSN 2019902623 filed Jul. 24, 2019, titled LIGHTWEIGHT TRAY WITH PNEUMATIC CUSHIONING SYSTEM, Australia Provisional Patent Application AUSN 2019902624 filed Jul. 24, 2019, titled METHOD FOR CREATING AN ADHESIVE BOND USING AN ELASTOMERIC MATERIAL, and Australia Provisional Patent Application AUSN 2019902625 filed Jul. 24, 2019, titled ENERGY-DISSIPATIVE PNEUMATIC CUSHIONING SYSTEM.

Technical Field

Embodiments herein are related to haul truck tray fabrication, and more particularly to methods of applying a protective coating or wear liner to a haul truck tray.

BACKGROUND

Haul trucks are heavy vehicles specifically engineered for use in high-production mines and heavy-duty construction environments. Existing haul truck wear liners are heavy, often including large Hardox steel plates.

SUMMARY

In view of the foregoing, an embodiment herein provides a method of applying a lightweight protective coating to a haul truck tray. The method includes the steps of (i) installing a mould on at least a portion of the haul truck tray; (ii) placing the at least a portion of the haul truck tray into a jig framework; (iii) heating at least a portion of the haul truck tray placed on the jig framework; (iv) providing a source of fluid protective coating at an elevated point on the at least a portion of the haul truck tray placed on the jig framework; (v) coating at least a portion of the haul truck tray surface with a substantially uniform layer of fluid protective coating; and (vi) allowing the substantially uniform layer of fluid protective coating to cure. The jig framework is configured to move the at least a portion of the haul truck tray in x, y, and z dimensions. The mould defines one or more spatial dimensions of the haul truck tray.

The embodiments herein mitigate the effects of existing multiple-stage injection methods which often result in a liner with many seams, and provide a virtually seamless method for coating the haul truck tray in one step, which enhances the strength, durability, and structural integrity of the haul truck tray. This in turn results in safer operation of the haul truck tray. Properties of the protective coating include high stiffness and strength, reduced weight compared with, e.g., steel wear plates, and corrosion resistance, which when taken together increase the structural integrity and strength of the haul truck tray. The protective coating may provide protection from high impacts and stresses during loading and dumping heavy, abrasive material, which may cause expensive damage to the haul truck tray.

In some embodiments, the at least a portion of the haul truck tray comprises at least one of carbon fiber resin or steel. Carbon fiber resin may provide a high strength to weight ratio, and has positive qualities in terms of absorbing vibrations.

In some embodiments, the mould includes a plurality of mould plates affixed to the at least a portion of the haul truck tray using a plurality of spacers. The mould may include a plurality of tail wear section mould plates affixed to a tail portion of the haul truck tray using a plurality of 15 millimetre (mm) spacers. In some embodiments, a rear edge of the tail portion is elevated to a height of about 1.5 meters relative to a front edge of the tail portion. The mould may be installed to define a substantially three-dimensional volume on a top surface on the bed of the haul truck tray. In some embodiments, the method includes the step of applying a mould sealer to the mould, which inhibits leaking during the pouring process.

In some embodiments, the jig framework is configured to move the at least one portion of the haul truck tray using hydraulic lifts. The jig framework may move the at least one portion of the haul truck in 2-axes, e.g. x- and y-directions. The jig framework may include a 2-axis gimbal. The jig framework may also be configured to move the at least one portion of the haul truck tray using a 3-axis gimbal. In some embodiments, the at least one portion of the haul truck tray placed on the jig framework is heated to a temperature of at least 25 degrees Celsius or above.

In some embodiments, the fluid protective coating includes fluid polyurethane. The fluid polyurethane may be pumped to the elevated point via a hose. The fluid polyurethane may be pumped at an average rate of about 5 kg/minute. The fluid polyurethane is poured such that it forms a surface coating inside the bed of the haul truck tray. In addition to abrasion protection, the surface coating prevents corrosion of the haul truck tray.

In some embodiments, the at least one portion of the haul truck tray surface is coated with a substantially uniform layer of fluid protective coating. The jig framework may be moved to facilitate gravitational spreading of the fluid protective coating over the at least one portion of the haul truck tray surface. The protective coating may include a tightly bonded resin structure that prevents scratches and provides for shining and finishing after curing.

In some embodiments, the method includes the step of applying a mould release coating to the jig framework. In some embodiments, applying the mould release coating to the jig framework includes applying a mould release coating before installing the mould on the at least one portion of the haul truck tray. The mould release coating may fill imperfections in the surface of the haul truck tray and facilitate release of the mould from the workpiece.

In some embodiments, the substantially uniform layer of fluid protective coating is allowed to cure for at least ten hours. The at least one portion of the haul truck tray placed on the jig framework may be heated in an oven for curing. The thickness of the substantially uniform layer of protective coating after curing may be between approximately 10 mm and 30 mm.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
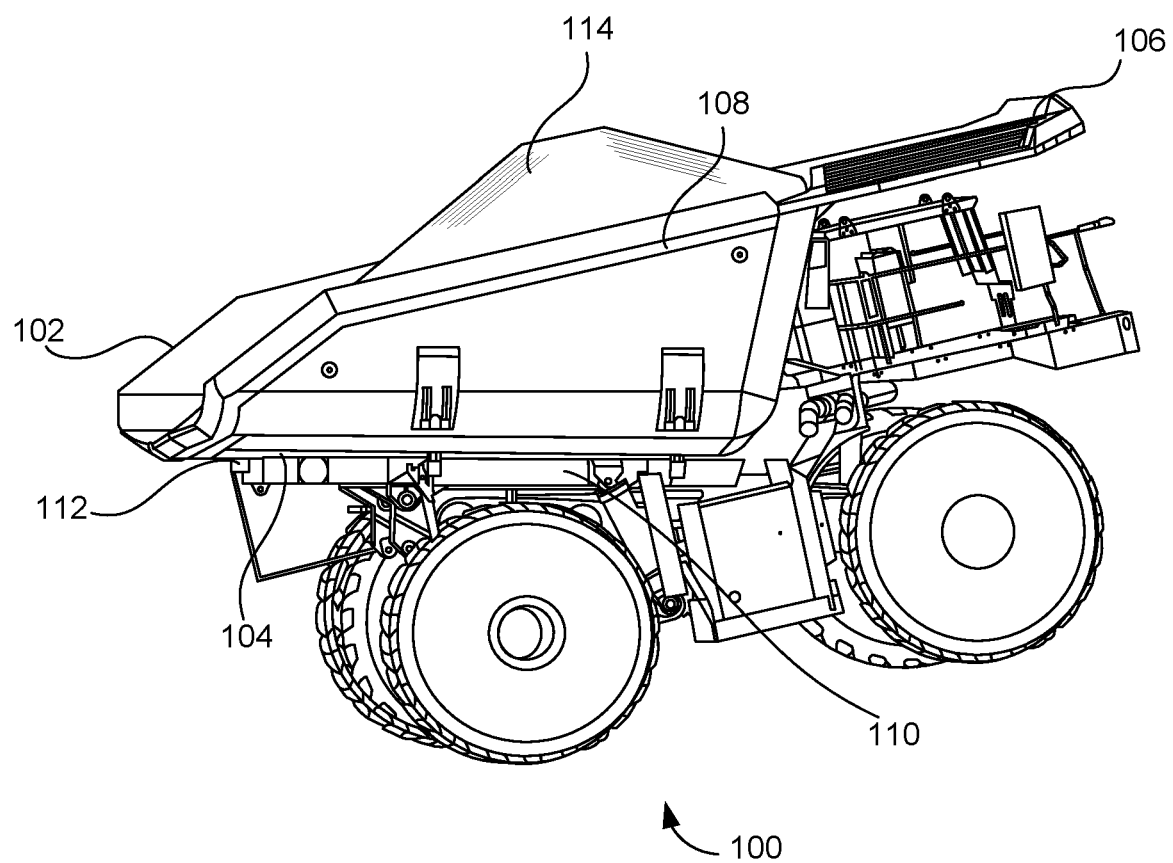
FIG. 1 illustrates an example view of a haul truck having a haul truck tray according to some embodiments herein.

The embodiments herein and the various features, values, and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein and the subject matter of the claims. Accordingly, the examples should not be construed as limiting the scope of the embodiments herein or the claims of this application.

As mentioned, the present inventions relate to a novel method for applying a protective coating to a haul truck tray. Referring now to the drawings, and more particularly to FIGS. 1 through 14, where similar reference characters denote corresponding feature values consistently throughout the figures, preferred embodiments are shown.

FIG. 1 illustrates an example view of a haul truck 100 having a haul truck tray 102 according to some embodiments herein. The haul truck 100 further may include a pneumatic shock absorption system 104, a canopy 106, a load-carrying assembly 108, and a stabilization and tray supporting system 110. The load-carrying assembly 108 may include a two-piece carbon fiber laminate tray structure. In some embodiments, the load-carrying assembly 108 has a high and low-density foam core and includes a carbon fiber laminate surface. In some embodiments, the haul truck tray 102 includes both carbon fiber and steel components. The carbon fiber composite material may include, for example, a polyacrylonitrile (PAN) material. The pneumatic shock absorption system 104 may include one or more pneumatic cushioning elements, one or more gas reservoirs, and one or more connector assemblies. While loading the haul truck tray 102, large impact forces strike a wear liner of the haul truck tray 102, placing extreme physical stresses on the haul truck tray 102, one or more support members 112 and/or the chassis of the haul truck. While loading the haul truck tray 102 with a load of materials 114, the pneumatic shock absorption system 104 that is filled with gas may absorb a portion of the energy of the large impact forces via compression of gas and a concomitant increase in pressure within the one or more pneumatic cushioning elements, and/or via release of gas into the one or more gas reservoirs. In some embodiments, the pneumatic shock absorption system 104 is designed to maintain a dynamic equilibrium in which the one or more pneumatic cushioning elements are kept at a substantially constant working pressure so that there is a capacity for additional gas compression and cushioning. Increased weight on the pneumatic shock absorption system 104, e.g., during loading of the haul truck tray 102 may supply a baseline net increasing force that increases the baseline pressure within the elongated compartment of the one or more pneumatic cushioning elements. This increased pressure may be regulated by the release of gas into the one or more gas reservoirs.

The stabilization and tray supporting system 110 includes one or more support members 112 for a tray support structure. In some embodiments, the tray support structure includes a welded steel structure. The tray support structure may also include at least one location for accepting a pivot mechanism connection and at least one location for accepting a hoisting mechanism connection. In some embodiments, the tray support structure includes one or more outriggers that are configured to provide roll stabilization support. The canopy 106 is attached along with the haul truck tray 102 to protect an operator cabin etc. In some embodiments, the canopy is not designed to carry the load but prevents damage to front parts of the haul truck 100 and injury to personnel inside the haul truck 100.

Figure 2:
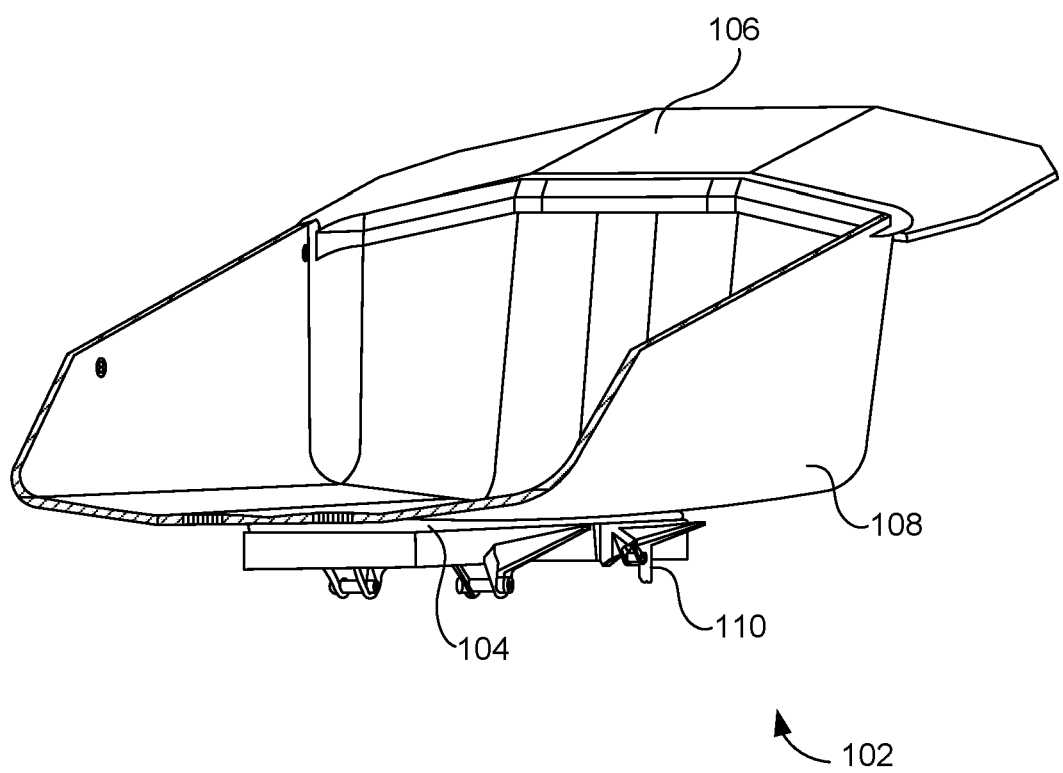
FIG. 2 illustrates a perspective view of the haul truck tray of FIG. 1 with a two-piece carbon fibre laminate tray structure according to some embodiments herein.

FIG. 2 illustrates a perspective view of the haul truck tray 102 of FIG. 1 with a two-piece carbon fibre laminate tray structure according to some embodiments herein. The haul truck tray 102 may include the pneumatic shock absorption system 104, the canopy 106, the load-carrying assembly 108, and the stabilization and tray supporting system 110. The pneumatic shock absorption system 104 absorbs, mitigates, and dampens shock impulses and pressure from the haul truck tray 102 in general. In some embodiments, the load-carrying assembly 108 includes a foam core and a carbon fiber laminate surface. The foam core may include a high- or low-density foam core, in some embodiments, the haul truck tray 102 comprises both carbon fiber and steel components. The load-carrying assembly 108 may include a two-piece carbon fiber laminate tray structure.

In some embodiments, the load-carrying assembly 108 includes polyurethane joints for shear strength, tensile strength, energy dissipation, and/or durability. In some embodiments, the polyurethane joints provide at least one of shear strength, tensile strength, energy dissipation, durability, or flexibility. The load-carrying assembly 108 may include a bed connector that connects with the stabilization and tray support system 110 to provide stabilization while loading the haul truck tray 102. In some embodiments, the stabilization and tray supporting system 110 is connected with the haul truck tray 102 using one or more bed connector assemblies. The one or inure bed connector assemblies may include known mechanisms for connecting a tray to a chassis, including any of chain links, pins, cams; or components of pivot sub-assembly, and/or a hoist portion. In some embodiments, the cams may permit rotation of the haul truck tray 102 relative to a pivot point on the chassis.

The stabilization and tray support system 110 includes one or more support members 112 for a tray support structure. In some embodiments, the tray support structure includes a welded steel structure. The tray support structure may also include at least one location for accepting a pivot mechanism connection and at least one location for accepting a hoisting mechanism connection. In some embodiments, the tray support structure includes one or more outriggers that are configured to provide roll stabilization support. The one or more support members 112 may include a pair of truck dump tray supports positioned at a chassis of a haul truck and the haul truck tray 102. The pair of haul truck dump tray supports may include two longitudinal support beams that are aligned with one or more wheels of the haul truck, which extend over a length from the front to the rear of the haul truck tray 102. In some embodiments, the two longitudinal support beams extend from a front to a rear of the haul truck tray 102. The pair of haul truck dump tray supports may include at least one carbon fiber composite material. The pneumatic shock absorption system 104 may dissipate at least a portion of the weight from the tray support structure, haul truck tray 102, and or load that is above the pneumatic shock absorption system 104.

Figure 3:
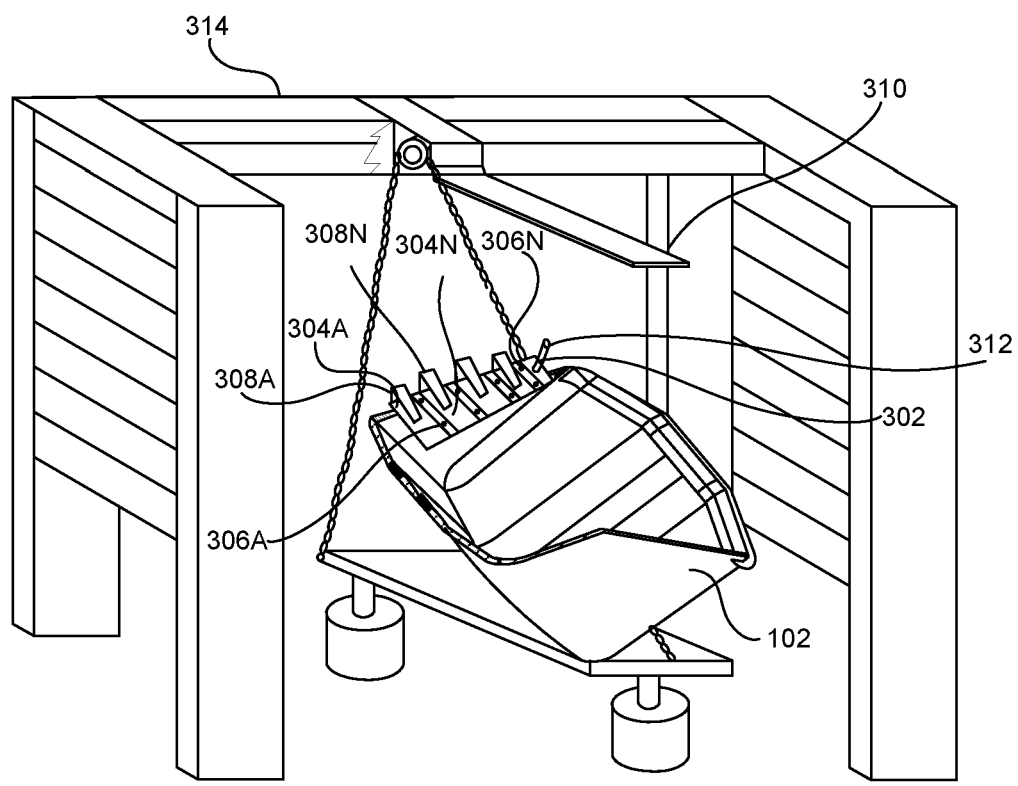
FIG. 3 illustrates a example system used to perform a method of applying a protective coating to the haul truck tray of FIG. 1 according to some embodiments herein.

FIG. 3 illustrates a example system used to perform a method for applying a protective coating to the haul truck tray 102 of FIG. 1 according to some embodiments herein. The haul truck tray 102 may include a protective coating or polyurethane surface coating or wear liner that provides resistance from abrasion and surface wear and tear. The protective coating for the haul truck tray 102 may be applied using a protective fluid. In some embodiments, the protective fluid includes fluid polyurethane. In some embodiments, the fluid polyurethane forms a surface coating inside a bed of the haul truck tray 102. A mould 302 may be installed on at least one portion of the haul truck tray 102 to contain the protective fluid and to provide for the desired thickness of the protective coating. Accordingly, mould 302 may define one or more spatial dimensions of the haul truck tray 102. In some embodiments, the mould 302 is installed to define a three-dimensional space on a top surface on the haul truck tray 102. The mould 302 may include a plurality of mould plates 304A-N that are affixed to the at least one portion of the haul truck tray 102 using a plurality of spacers 306A-N. In some embodiments, the mould plate 304 is a modular block that is placed next to another mould plate and sealed to form boundaries of the mould 302. The mould 302 may include a plurality of tail wear section mould plates that are affixed to a tail portion of the haul truck tray 102 using spacers 306A-N with sizes that may range from 10 mm to 20 mm. In some embodiments, the at least one portion of the haul truck tray 102 is comprised of composite resin, carbon fiber laminate, and/or steel.

The at least one portion of the haul truck tray 102 may be placed into jig framework 310. The jig framework 310 is configured to move the at least one portion of the haul truck tray 102 in x, y, and z dimensions. The jig framework 310 may include one or more a hydraulic lift, a pneumatic lift, or a crane and/or one or more gimbals. In some embodiments, the one or more gimbals include at least one of 2-axis gimbals or 3-axis gimbals. The at least one portion of the haul truck tray 102 placed on the jig framework 310. In some embodiments, the at least one portion of the haul truck tray 102 on the jig framework 310 is heated at a temperature ranging from 60 to 120 degrees Celsius. In some embodiments, the at least one portion of the haul truck tray 102 placed on the jig framework 310 is heated in an oven 314 for curing.

In pouring the fluid protective coating, a source of fluid protective coating is provided at an elevated point on the at least one portion of the haul truck tray 102 that is placed on the jig framework 310. In some embodiments, the protective fluid (e.g., fluid polyurethane) is pumped to the elevated point via a hose 312. In some embodiments, the protective fluid (e.g., fluid polyurethane) is pumped to the elevated point at an average rate of 2.5 kilograms (kg) to 7.5 kg per minute. A surface of at least one portion of the haul truck tray 102 may be coated with a substantially uniform layer of protective fluid and the substantially uniform layer of fluid protective coating is allowed to cure. In some embodiments, the substantially uniform layer of fluid protective coating is allowed to cure for at least 8 hours to 12 hours.

In some embodiments, the at least one portion of the haul truck tray 102 is coated with the protective fluid by moving the jig framework 310 to facilitate gravitational spreading of the protective fluid over a surface of the at least one portion of the haul truck tray 102. In some embodiments, the thickness of the substantially uniform protective layer ranges from 10 mm to 30 mm after curing. In some embodiments, a rear edge of the tail portion of the haul truck tray 102 is elevated to a height of about 0.5 meters relative to a front edge of the tail portion haul truck tray 102. In some embodiments, the rear edge of the tail portion of the haul truck tray 102 is elevated to a height ranging from 0.5 meters to 20 meters relative to the front edge of the tail portion of the haul truck tray 102. In some embodiments, a mould sealer may be applied to the mould 302. In some embodiments, a mould release coating is applied to at least a portion of the haul truck tray 102 with mould 302 in place.

Figure 4:
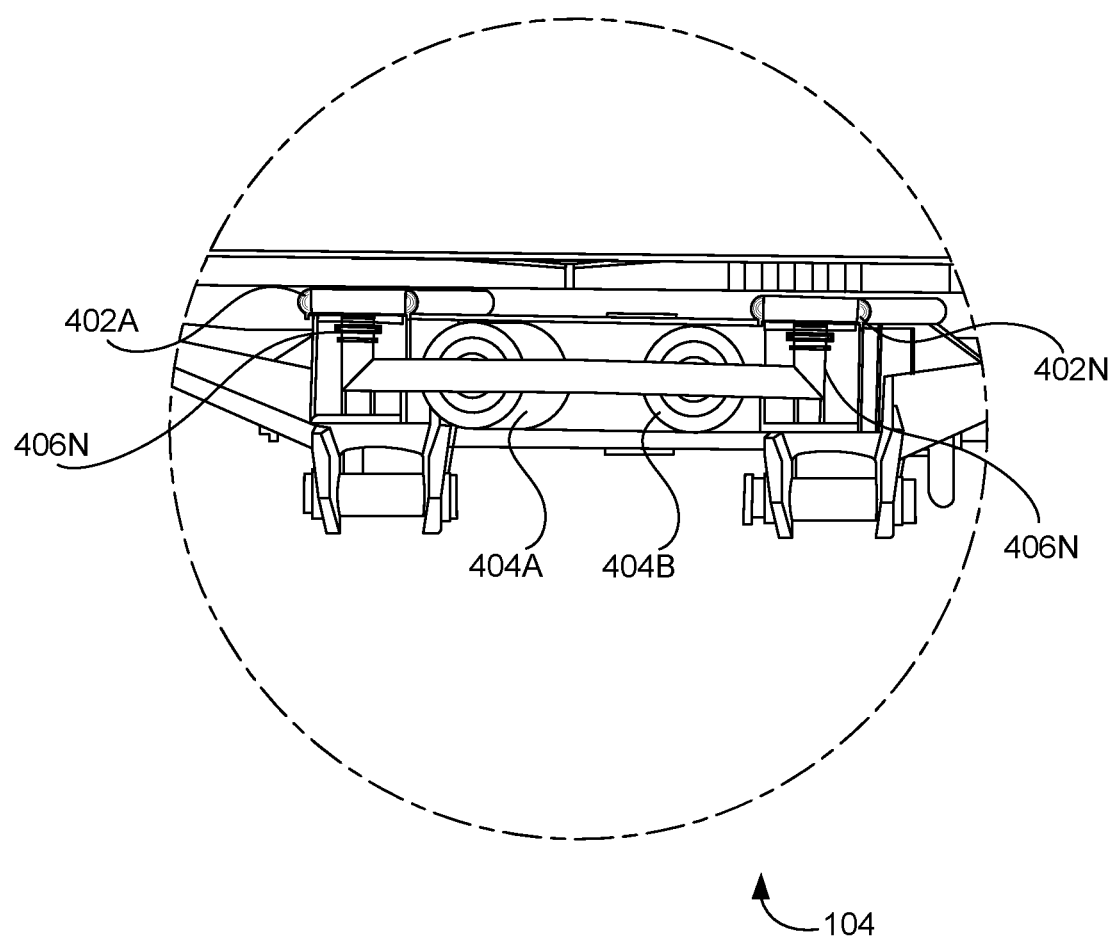
FIG. 4 illustrates an example exploded view of a pneumatic shock absorption system of the haul truck tray of FIG. 1 according to some embodiments herein.

FIG. 4 illustrates an example exploded view of the pneumatic shock absorption system 104 of the haul truck tray 102 of FIG. 1 according to some embodiments herein. The pneumatic shock absorption system 104 reduces stress on the chassis of the haul truck 100 while loading the haul truck tray 102. The pneumatic shock absorption system 104 may include one or more pneumatic cushioning elements 402A-N, one or more gas reservoirs 404A-N, and one or more connector assemblies 406A-N. The one or more pneumatic cushioning elements 402A-N may include a compartment that may be elongated and expandable. The compartment may initially be at a baseline pressure and it may expand on receiving an increased pressure from the one or more gas reservoirs 404A-N. The expansion of the compartment may be primarily parallel to the longitudinal axis of the haul truck 100, or alternatively, primarily orthogonal to the longitudinal axis of the haul truck 100. The one or more pneumatic cushioning elements 402A-N may nominally lift the haul truck tray 102 above one or more support members 112 (e.g. a wound carbon fiber beam) with the baseline pressure in the compartment. The one or more pneumatic cushioning elements 402A-N may be capable of accepting, holding, and/or releasing the gas. In some embodiments, the one or more pneumatic cushioning elements 402A-N are adapted to release at least a portion of gas when the pressure inside the one or more pneumatic cushioning elements 402A-N reaches a threshold value. For example, the one or more pneumatic cushioning elements 402A-N may manage transient pressures ranging from 5 bar to 7 bar. In some embodiments, the pneumatic shock absorption system 104 includes at least one of a pair of elongated polyethylene air tanks or a pair of elongated polypropylene air tanks.

The one or more connector assemblies 406A-N may be operable to communicatively couple the one or more pneumatic cushioning elements 402A-N and the one or more gas reservoirs 404A-N. The one or more connector assemblies 406A-N may allow a return of at least a portion of the gas to the one or more pneumatic cushioning elements 402A-N on the reduction of at least a portion of the force of the load. The one or more connector assemblies 406A-N may be communicatively coupled to the one or more pneumatic cushioning elements 402A-N and the one or more gas reservoirs 404A-N. In some embodiments, the one or more connector assemblies 406A-N includes at least one valve and at least one flange. The one or more connector assemblies 406A-N may accept air from the one or more gas reservoirs 404A-N. The one or more connector assemblies 406A-N may also be configured to accept air from the gas supply unit. In some embodiments, the one or more gas reservoirs 404A-N is itself a gas supply unit. The gas supply unit may include at least one air compressor. The pair of elongated air tanks may be connected to the pair of elongated pneumatic cushioning elements via the one or more connector assemblies 406A-N. In some embodiments, the one or more connector assemblies 406A-N includes at least one connector pipe. The pair of elongated air tanks may be connected to the pair of elongated pneumatic cushioning elements via the at least one connector pipe. For example, the at least one connector pipe may be at least one of a polyethylene pipe, a polypropylene pipe, or a polyvinylchloride pipe. In some embodiments, the at least one connector pipe includes a valve that is operable to functionally separate the pair of elongated air tanks into non-linked individual (e.g., independent) compartments.

Figure 5:
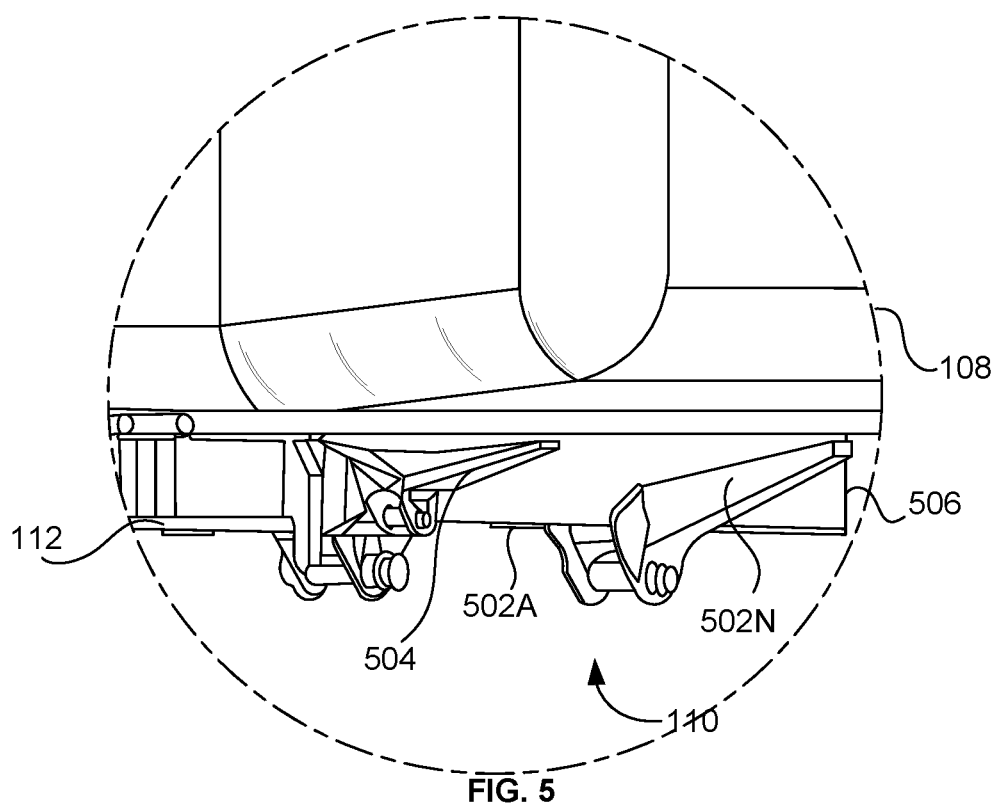
FIG. 5 illustrates an example exploded view of a stabilization and tray support system f the haul truck tray of FIG. 1 according to some embodiments herein.

FIG. 5 illustrates an exemplary exploded view of the stabilization and tray support system 110 of the haul truck tray 102 of FIG. 1 according to some embodiments herein. The stabilization and tray support system 110 may include one or more support members 112, one or more forward outriggers 502A-N, one or more rear outriggers 504, a torque box (not shown) and a rear frame assembly 506. The stabilization and tray support system 110 prevents the haul truck tray 102 from tipping over while it is loaded. For example, during loading of the haul truck tray 102 or during transport, forces may push on one or more of the sidewalk of the haul truck tray 102 causing it to tip laterally. In order to prevent the haul truck tray 102 from tipping over, the one or more forward outriggers 502A-N and the one or more rear outriggers 504 may anchor the haul truck tray 102 sides to an out carriage or other point on a haul truck support structure (e.g., support members 112 or the chassis). thereby providing an opposing force for stability. In some embodiments, the one or more forward outriggers 502A-N and the one or more rear outriggers 504 stabilize the haul truck tray 102 during uneven loading, which may favour one side of the haul truck tray 102 over the other side. The one or more forward outriggers 502A-N and the one or more rear outriggers 504 may also provide an opposing force for stability while hauling.

Figure 6:
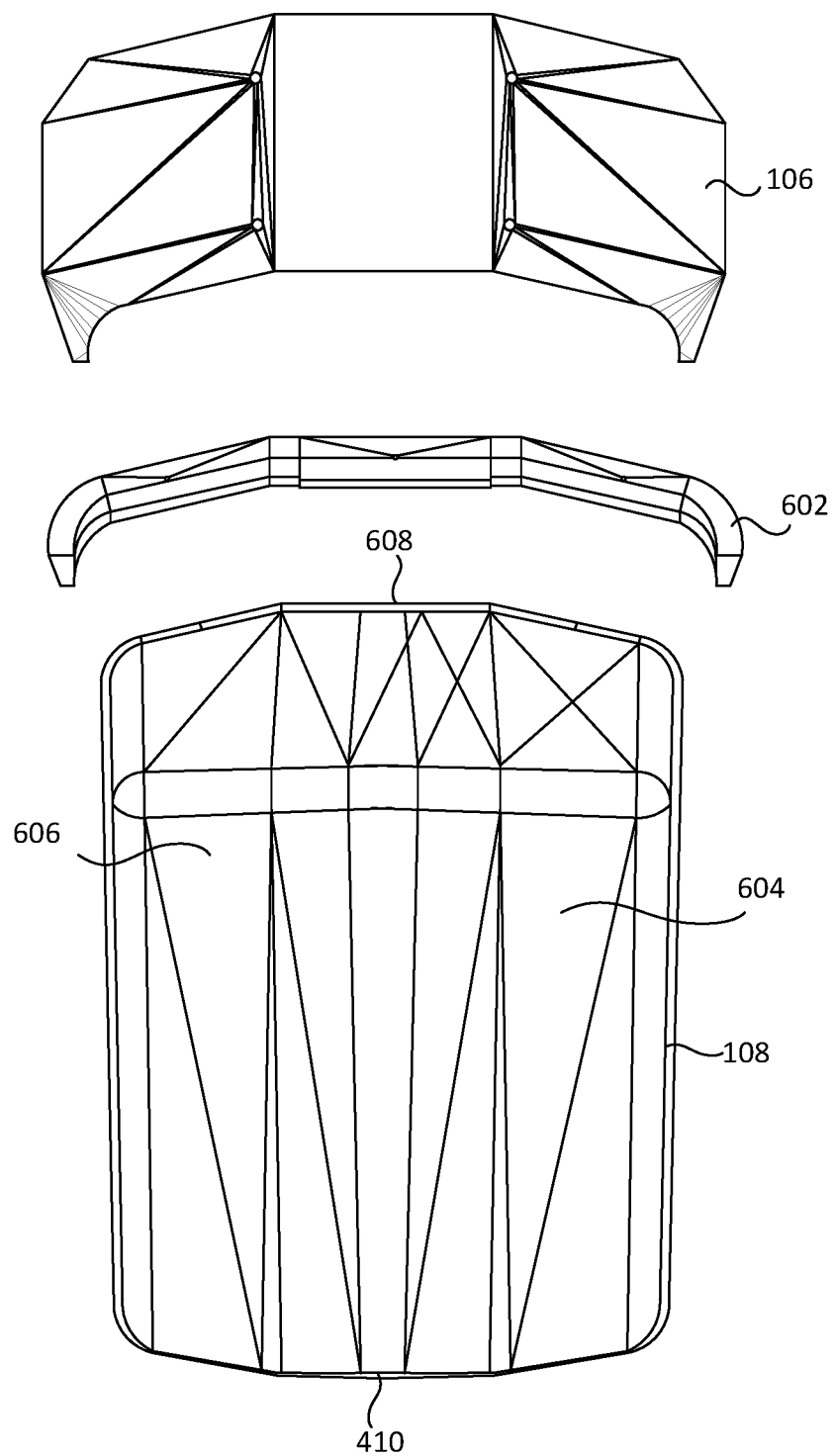
FIG. 6 illustrates an example exploded view of the haul ruck tray of FIG. 1 according to some embodiments herein.

FIG. 6 illustrates an example exploded view of the haul truck tray 102 of FIG. 1 according to some embodiments herein. The haul truck tray 102 includes the load-carrying assembly 108 that may mechanically connect with the canopy 106 and a canopy joining member 602. The load-carrying assembly 108 includes a first longitudinal body portion 604, a second longitudinal body portion 606, a top edge portion 608, and a bottom edge portion 610. The first longitudinal body portion 604 and the second longitudinal body portion 606 are mechanically connected using an interposing elastomeric link. The canopy joining member 602 may include a first channel or a groove that is positioned to receive joining portions respectively of the first longitudinal body portion and the second longitudinal body portion. In some embodiments, the canopy joining member 602 includes the interposing elastomeric link. In some embodiments, the interposing elastomeric link is a polyurethane bonding layer of at least 3 mm in thickness. In some embodiments, the interposing elastomeric link is cast polyurethane. In some embodiments, the interposing elastomeric link is formed by the curing of a urethane applied in fluid form.

Figure 7:
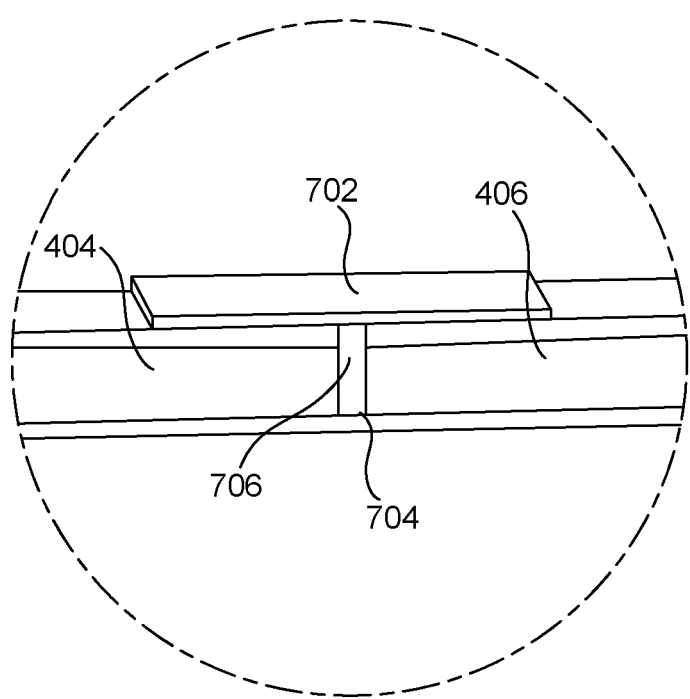
FIG. 7 illustrates an example cross-sectional view of a top edge portion of the haul truck tray of FIG. 1 according to some embodiments herein.

FIG. 7 illustrates an example cross-sectional view of the top edge portion 608 of the haul truck tray 102 according to some embodiments herein. The top edge portion 608 may include a bottom support member 702, a topside support member 704, an interposing elastomeric link 706, the first longitudinal body portion 604, the second longitudinal body portion 606 and matching edges (not shown in figures). In some embodiments, the first longitudinal body portion 404 and the second longitudinal body portion 406 are mechanically connected using the interposing elastomeric link 706. The bottom support member 702 and the topside support member 704 provide support for the tray support structure. These support members may be made of composite polymer, steel, or other suitable material.

Figure 8:
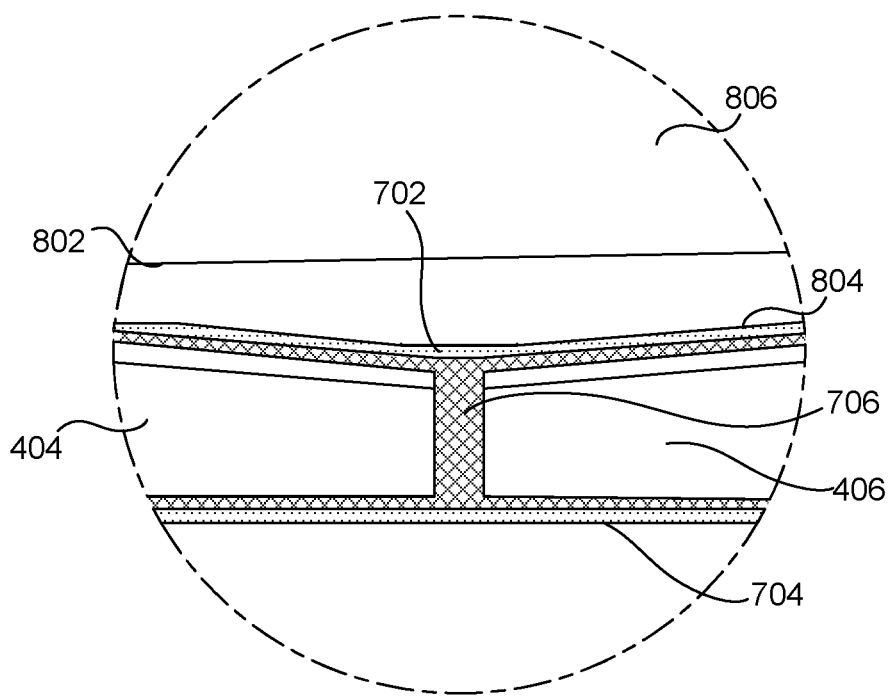
FIG. 8 illustrates an example cross-sectional view of a bottom edge portion of the haul truck tray of FIG. 1 according to some embodiments herein.

FIG. 8 illustrates an example cross-sectional view of the bottom edge portion 410 of the haul truck tray 102 according to some embodiments herein. In some embodiments, the first longitudinal body portion 604 and the second longitudinal body portion 606 are mechanically connected using the interposing elastomeric link 706. The bottom edge portion 610 may include a wear liner 802, the elastomeric link 706, a tapered edge 804, the bottom support member 702, the first longitudinal body portion 604, the second longitudinal body portion 606 and a surface coating 806. In some embodiments, the wear liner 802 includes an elastomeric material. In some embodiments, the elastomeric link 706 includes a polyurethane joint for providing shear, strength, tensile strength, energy dissipation, durability, and/or flexibility. In some embodiments, the elastomeric link 606 extends across the width of the first longitudinal body portion 604 and the second longitudinal body portion 606. The surface coating 806 may include a fluid polyurethane that provides resistance from abrasion and surface wear and tear.

Figure 9:
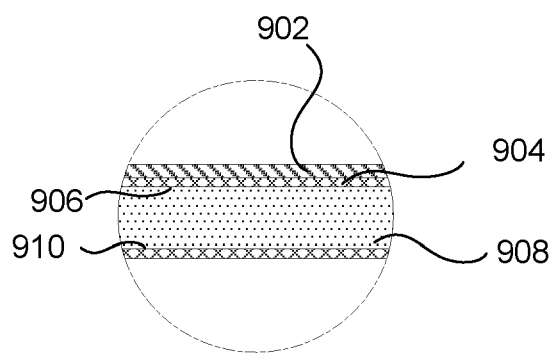
FIG. 9 illustrates an example cross-sectional view of a canopy of the haul truck tray of FIG. 1 according to some embodiments herein.

FIG. 9 illustrates an example cross-sectional view of the canopy 106 of the haul truck tray 102 of FIG. 1 according to some embodiments herein. The canopy 106 may include at least one layer of polyurethane wear line 902, a carbon fiber composite material 904, a first surface area 906, a low-density foam core 908, and a second surface area 910. In some embodiments, a top and a bottom layer of the canopy 106 may be made up of carbon fiber composite material 904 that may be at least one of aerospace or industrial grade. In some embodiments, the first surface area 906 and the second surface area 910 are configured to accommodate the elastomeric link 706.

Figure 10:
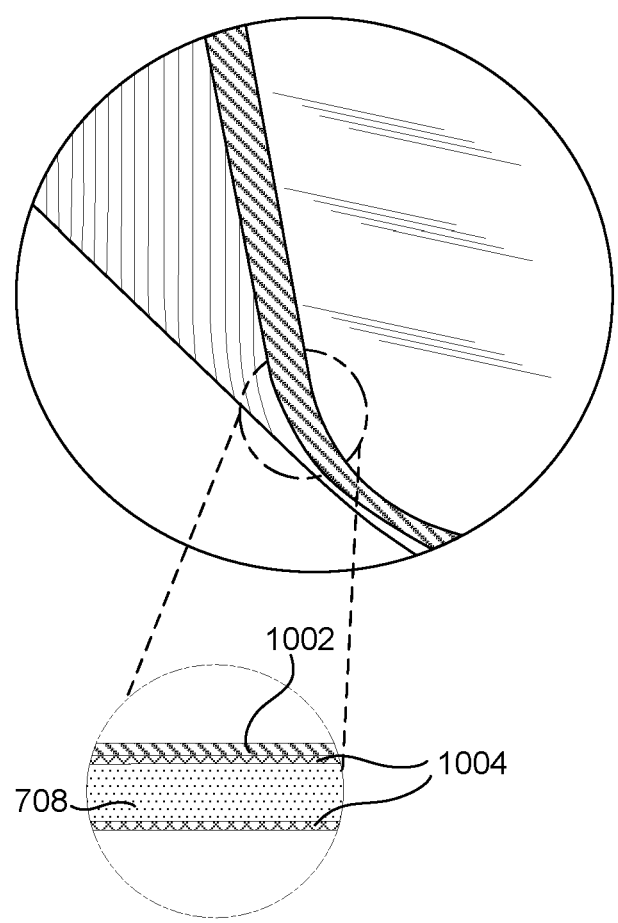
FIG. 10 illustrates an example cross-sectional view of the haul truck tray of FIG. 1 according to some embodiments herein.

FIG. 10 illustrates an example cross-sectional view of the haul truck tray 102 of FIG. 1 according to some embodiments herein. The haul truck tray 102 includes a polyurethane wear line 1002, a carbon fibre laminate surface 1004, and the low-density foam core 908. In some embodiments, the load-carrying assembly 108 includes a foam core and a carbon fiber laminate surface 1004. The foam core may include a high- or low-density foam core. In some embodiments, the haul truck tray 102 includes both carbon fiber and steel components. The load-carrying assembly 108 may include a two-piece carbon fiber laminate tray structure.

Figure 11:
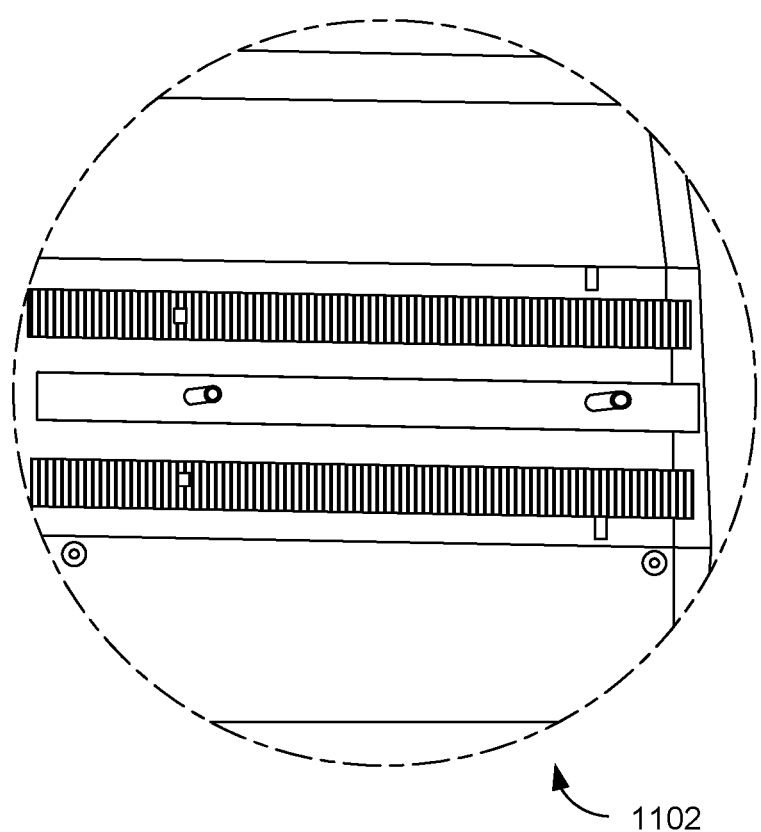
FIG. 11 illustrates an example bottom view of the haul truck tray of FIG. 1 according to some embodiments herein.

FIG. 11 illustrates an example bottom view 1102 the haul truck tray 102 according to some embodiments herein. The bottom view 1102 of the haul truck tray 102 includes a high-density foam core construction. The high-density foam core construction may include polycarbonate. PVC high density, or foamed polycarbonate, which enhances the strength and durability of the haul truck tray 102, thereby improving the structural integrity of the haul truck tray 102.

Figure 12:
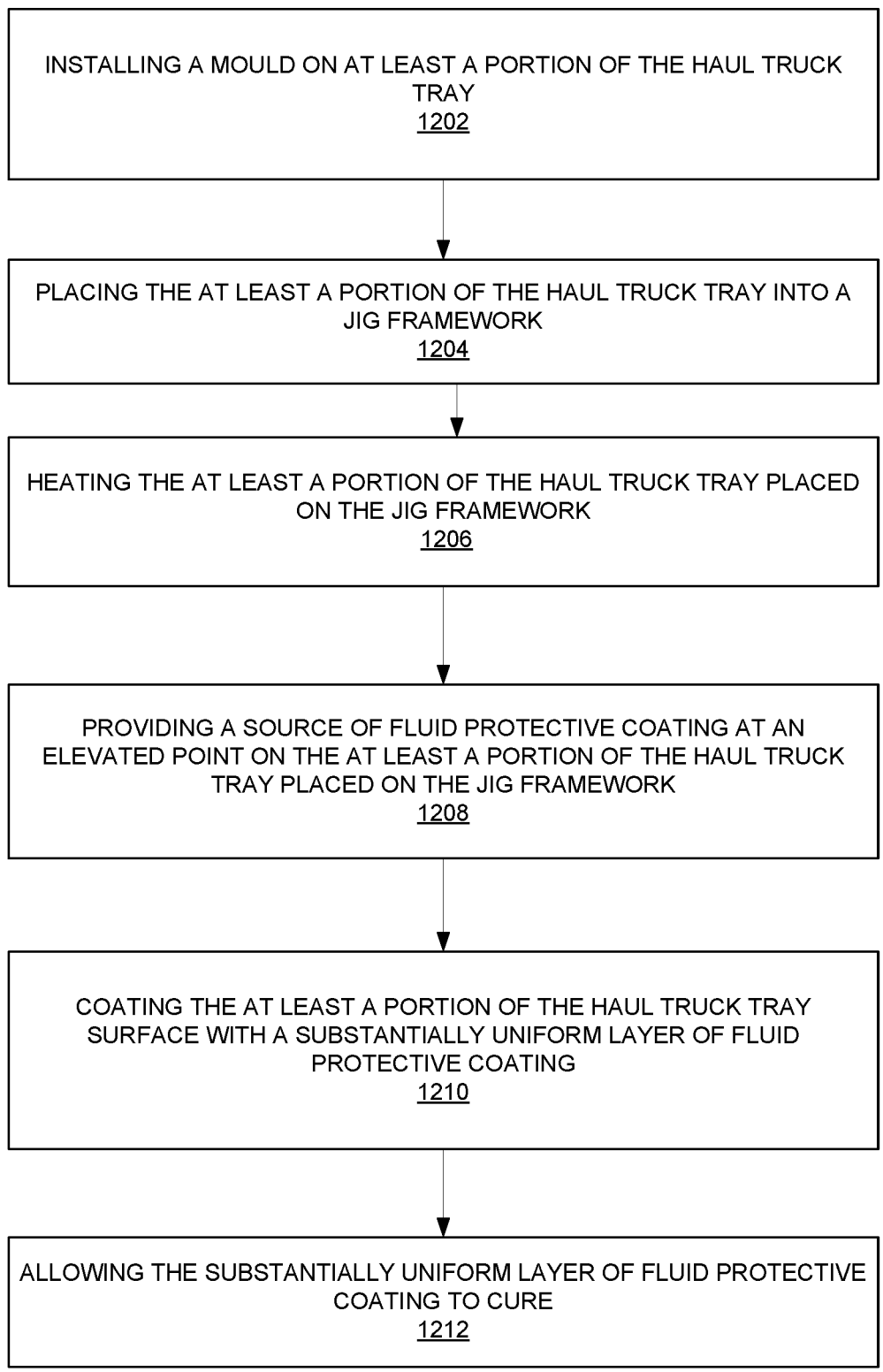
FIG. 12 illustrates a flow chart of a method of applying a protective coating to the haul truck tray of FIG. 1 according to some embodiments herein.

FIG. 12 illustrates a flow chart of a method of applying a protective coating to the haul truck tray 102 of FIG. 1 according to some embodiments herein. At step 1202, a mould on at least a portion of the haul truck tray is installed. The mould determines one or more spatial dimensions of the haul truck tray 102 and is installed to determine a substantially three-dimensional volume on a top surface on the haul truck tray 102. At step 1204, the at least a portion of the haul truck tray is placed into a jig framework. In some embodiments, the jig framework 310 is configured to move the at least one portion of the haul truck tray 102 in x, y, and z dimensions. At step 1206, the at least a portion of the haul truck tray is placed on the jig framework and heated. The at least one portion of the haul truck tray may be heated using the oven 312. At step 1208, a source of fluid protective coating is provided at an elevated point on the at least a portion of the haul truck tray placed on the jig framework. In some embodiments, the protective fluid (e.g. fluid polyurethane) is pumped to the elevated point using the hose 312 that is in a required shape. At step 1210, the at least a portion of the haul truck tray surface is coated with a substantially uniform layer of fluid protective coating. In some embodiments, the jig framework 310 is moved in a required direction to facilitate the gravitational spreading of the protective fluid over a surface of the at least one portion of the haul truck tray 102. At step 1212, the substantially uniform layer of fluid protective coating is allowed to cure.

Figure 13:
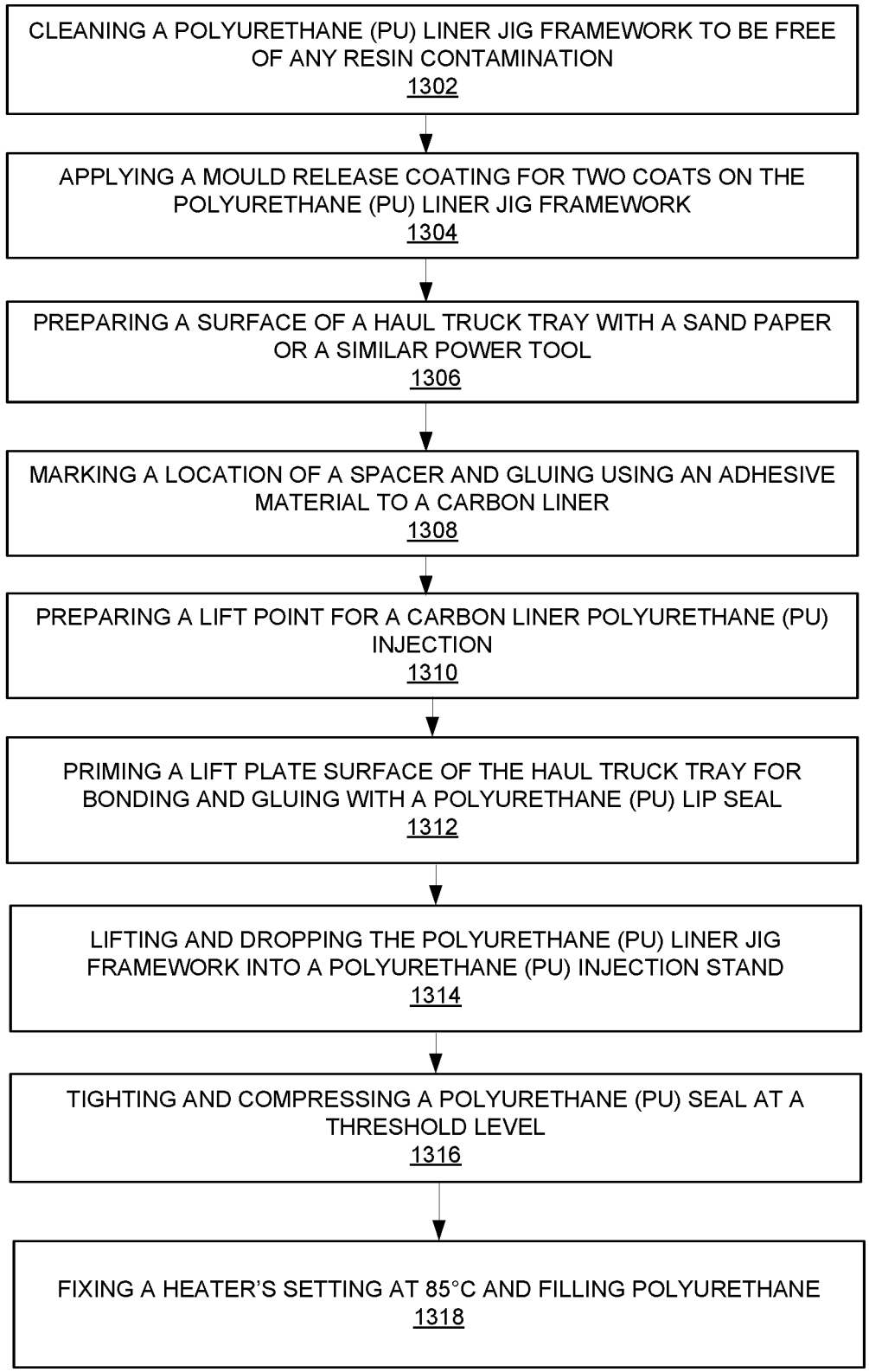
FIG. 13 illustrates a flow chart of a method for carbon liner Polyurethane (PU) injection that is employed for applying the protective coating on the haul truck tray of FIG. 1 according to some embodiments herein.

FIG. 13 illustrates a flow chart of a method for carbon liner polyurethane (PU) injection that is employed for applying the protective coating on the haul truck tray 102 of FIG. 1 according to some embodiments herein. At step 1302, the jig framework 310 is cleaned first to be free of any resin contamination. In some embodiments, the jig framework 310 includes a polyurethane (PU) liner jig framework. At step 1304, a mould release coating is applied to a portion of haul truck tray 102. A 20 mm spacer 306 may be glued onto the jig framework 310 to help locate a lay-flat hose 312 for injection/pouting. At step 1306, the surface of the haul truck tray 102 is prepared with sandpaper or a power sander. At step 1308, a location for the spacer 306 is then marked and glued in place. Then, a desired thickness of polyurethane (PU) spacer is installed on the haul truck tray 102. At step 1310, a lift point for the carbon liner polyurethane (PU) injection is prepared. The carbon liner surface is prepared and cleaned with acetone and then allowed to dry before pouring the polyurethane (PU). At step 1312, a lift plate surface of the haul truck tray 102 is primed for bonding and glued with a polyurethane (PU) lip seal. The carbon liner may be lifted onto the jig framework 310 and the mould lift point is installed.

At step 1314, the jig framework 310 is lifted and dropped into a polyurethane (PU) injection stand, and the jig framework 310 is secured to the polyurethane (PU) injection stand. At step 1316, the polyurethane (PU) seal may be tightened and compressed at a threshold level. In some embodiments, an injection hose is connected to the lay-flat hose 312 and is properly secured to an electric winch. At step 1318, a heater's setting is fixed to about 85° C. and the polyurethane is injected/poured. The liner may then be cured for about 12 hrs before being de-moulded.

Figure 14:
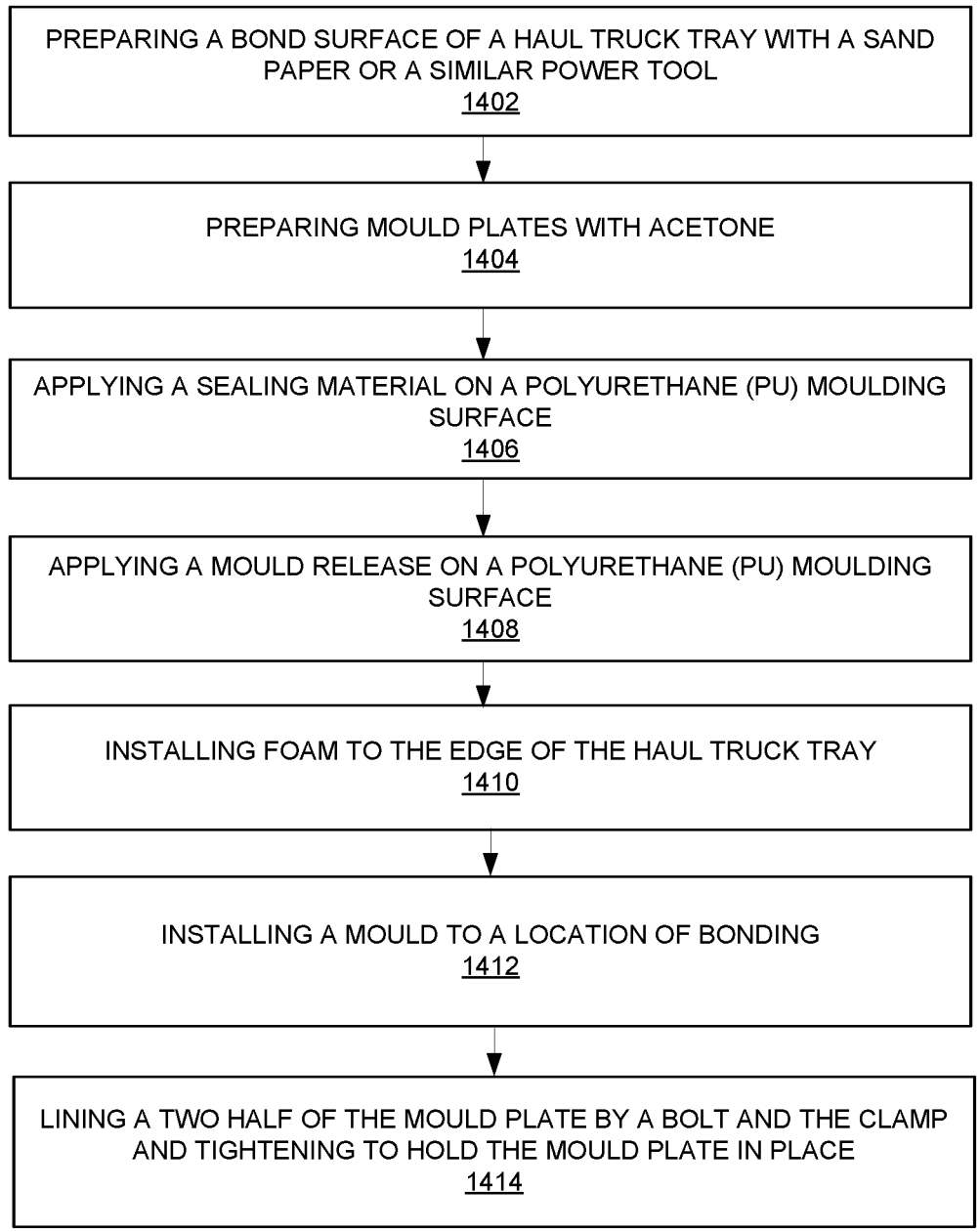
FIG. 14 illustrates a flow chart of a method for tail wear liner polyurethane (PU) pouring that is employed for applying the protective coating on the haul truck tray of FIG. 1 according to some embodiments herein.

FIG. 14 illustrates a flow chart of a method for wear liner polyurethane (PU) pouring that is employed for applying the protective coating on the haul truck tray 102 of FIG. 1 according to some embodiments herein. At step 1402, a bonding surface is prepared with light sanding, and then the bonding surface is cleaned with standard solvents. At step 1404, the mould plates 304A-N are prepared and the surface of the mould plates 304A-N is dried. The surface of the mould plates 304A-N is cleaned with the acetone. At step 1406, a sealing material is applied to a polyurethane (PU) moulding surface. At step 1408, a mould release material is applied to a polyurethane (PU) moulding surface. At step 1410, foam is installed to the edge of the haul truck tray 102. At step 1412, the mould 302 is installed at a location for bonding and (a) a bottom mould section for a bottom portion of the haul truck tray 102 with a 1.5 mm spacer and (b) a top mould section on a top portion of the haul truck tray 102 is placed. A clamp 308 is then installed. At step 1414, the mould plates 304A-N are secured and the clamps are tightened to hold the mould plates 304A-N in place. The haul truck tray 102 may be then placed in oven 314 for pre-heating. The polyurethane is poured and the haul truck tray 102 may be pre-heated in the oven 314 at about 80° C. In some embodiments, a flow rate of pouring the polyurethane is set to 5 kg/min and may be adjusted when necessary. In some embodiments, the haul truck tray 102 is moved back into the oven 314 for curing at about 80° C. for a minimum of 8 hrs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the appended claims.

We claim:

1. A method of applying a protective coating to a haul truck tray comprising:
   - installing a mould on at least a portion of the haul truck tray, wherein the mould defines one or more spatial dimensions of the haul truck tray;
   - placing; the at least a portion of the haul truck tray into a jig framework, wherein the jig framework is configured to Move the at least a portion of the haul truck tray in x, y, and z dimensions;
   - heating the at least a portion of the haul truck tray placed on the jig framework;
   - providing a source of fluid protective coating at an elevated point on the at least a portion of the haul truck tray placed on the jig framework;
   - coating the at least a portion of the haul truck tray surface with a substantially uniform layer of fluid protective coating; and
   - allowing the substantially uniform layer of fluid protective coating to cure.

2. The method of claim 1, wherein the at least a portion of the haul truck tray comprises at least one of carbon fiber resin or steel.

3. The method of claim 1, wherein the mould comprises a plurality of mould plates affixed to the at least a portion of the haul truck tray using a plurality of spacers.

4. The method of claim 1, wherein the mould is installed to define one or more three-dimensional volumes on a top surface of the bed of the haul truck tray.

5. The method of claim 1, further comprising applying a mould sealer to the mould.

6. The method of claim 1, wherein the jig framework is configured to move the at least a portion of a haul truck tray using at least one of a hydraulic lift, a pneumatic lift, or a crane.

7. The method of claim 1, wherein the jig framework is configured to move the at least a portion of a haul truck tray using a 2-axis gimbal or a 3-axis gimbal.

8. The method of claim 1, wherein the heating the at least a portion of the haul truck tray placed on the jig framework is done at 25 degrees Celsius or above.

9. The method of claim 1, wherein the fluid protective coating comprises fluid polyurethane.

10. The method of claim 9, wherein the fluid polyurethane is pumped to the elevated point via a hose.

11. The method of claim 10, wherein the fluid polyurethane is pumped at an average rate of about 5 kg/minute.

12. The method of claim 1, wherein the coating the at least a portion of the haul truck tray surface with a substantially uniform layer of fluid protective coating comprises moving the jig framework to facilitate gravitational spreading of the fluid protective coating over the at least a portion of the haul truck tray surface.

13. The method of claim 9, wherein the fluid polyurethane forms a surface coating on at least a portion of the bed of the haul truck tray.

14. The method of claim 1, further comprising applying a mould release coating to the jig framework.

15. The method of claim 14, wherein the applying a mould release coating to the jig framework comprises applying a mould release coating before installing the mould on the at least a portion of the haul truck tray.

16. The method of claim 1, wherein the substantially uniform layer of fluid protective coating is allowed to cure for at least ten hours.

17. The method of claim 16, wherein an at least partially cured substantially uniform layer of the protective coating is heated in an oven.

18. The method of claim 17, wherein the oven is heated to between 60 to 120 degrees Celsius.

19. The method of claim 1, wherein the thickness of the substantially uniform layer of protective coating after curing is between 10 mm and 30 mm.

* * * * *